US011368466B2

(12) United States Patent
Vigna

(10) Patent No.: US 11,368,466 B2
(45) Date of Patent: Jun. 21, 2022

(54) DATA CLASSIFICATION OF COLUMNS FOR WEB REPORTS AND WIDGETS

(71) Applicant: David Michael Vigna, Sterling, VA (US)

(72) Inventor: David Michael Vigna, Sterling, VA (US)

(*) Notice: Subject to any disclaimer, the term of this patent is extended or adjusted under 35 U.S.C. 154(b) by 0 days.

(21) Appl. No.: 16/946,460

(22) Filed: Jun. 23, 2020

(65) Prior Publication Data

US 2021/0084050 A1 Mar. 18, 2021

Related U.S. Application Data

(60) Provisional application No. 62/902,001, filed on Sep. 18, 2019.

(51) Int. Cl.
*G06F 16/10* (2019.01)
*H04L 9/40* (2022.01)
*G06F 16/9538* (2019.01)
*G06F 16/906* (2019.01)
*G06F 16/958* (2019.01)

(52) U.S. Cl.
CPC .......... *H04L 63/105* (2013.01); *G06F 16/906* (2019.01); *G06F 16/958* (2019.01); *G06F 16/9538* (2019.01)

(58) Field of Classification Search
CPC ... G06F 16/906; G06F 16/958; G06F 16/9538
See application file for complete search history.

(56) References Cited

U.S. PATENT DOCUMENTS

| 5,751,949 | A | 5/1998 | Thomson et al. |
|---|---|---|---|
| 6,275,824 | B1 | 8/2001 | OFlaherty et al. |
| 6,587,854 | B1 | 7/2003 | Guthrie et al. |
| 6,636,861 | B1 | 10/2003 | Stack |
| 7,310,647 | B2 | 12/2007 | Lei et al. |
| 7,685,207 | B1 | 3/2010 | Helms |
| 8,024,339 | B2 | 9/2011 | Barker et al. |
| 9,087,212 | B2 | 7/2015 | Balakrishnan et al. |
| 2007/0112554 | A1* | 5/2007 | Goradia ............... G06F 40/242 704/4 |
| 2010/0325173 | A1 | 12/2010 | Haley et al. |
| 2011/0321154 | A1 | 12/2011 | Dau et al. |
| 2012/0089562 | A1 | 4/2012 | Deremigio et al. |
| 2012/0197919 | A1 | 8/2012 | Chen et al. |
| 2014/0006342 | A1 | 1/2014 | Love et al. |
| 2014/0012833 | A1 | 1/2014 | Humprecht |
| 2015/0113659 | A1 | 4/2015 | DCosta et al. |
| 2017/0104746 | A1 | 4/2017 | Nair et al. |
| 2017/0300702 | A1* | 10/2017 | Tegegne ............. G06F 21/6218 |
| 2018/0137106 | A1* | 5/2018 | Platek .................... G06F 40/47 |
| 2018/0157468 | A1 | 6/2018 | Stachura |
| 2018/0227216 | A1* | 8/2018 | Hughes .................. H04L 45/08 |
| 2019/0138509 | A1* | 5/2019 | von Rickenbach ... G06F 16/285 |

* cited by examiner

*Primary Examiner* — Baoquoc N To
(74) *Attorney, Agent, or Firm* — Dunlap Bennett & Ludwig, PLLC

(57) ABSTRACT

A method of restricting data through a data source connection with a web application, including applying a data classification to each data column of the data source, wherein the application of each data classification is based on a data set in a data file or data column in a database not supported by the data classification.

5 Claims, 4 Drawing Sheets

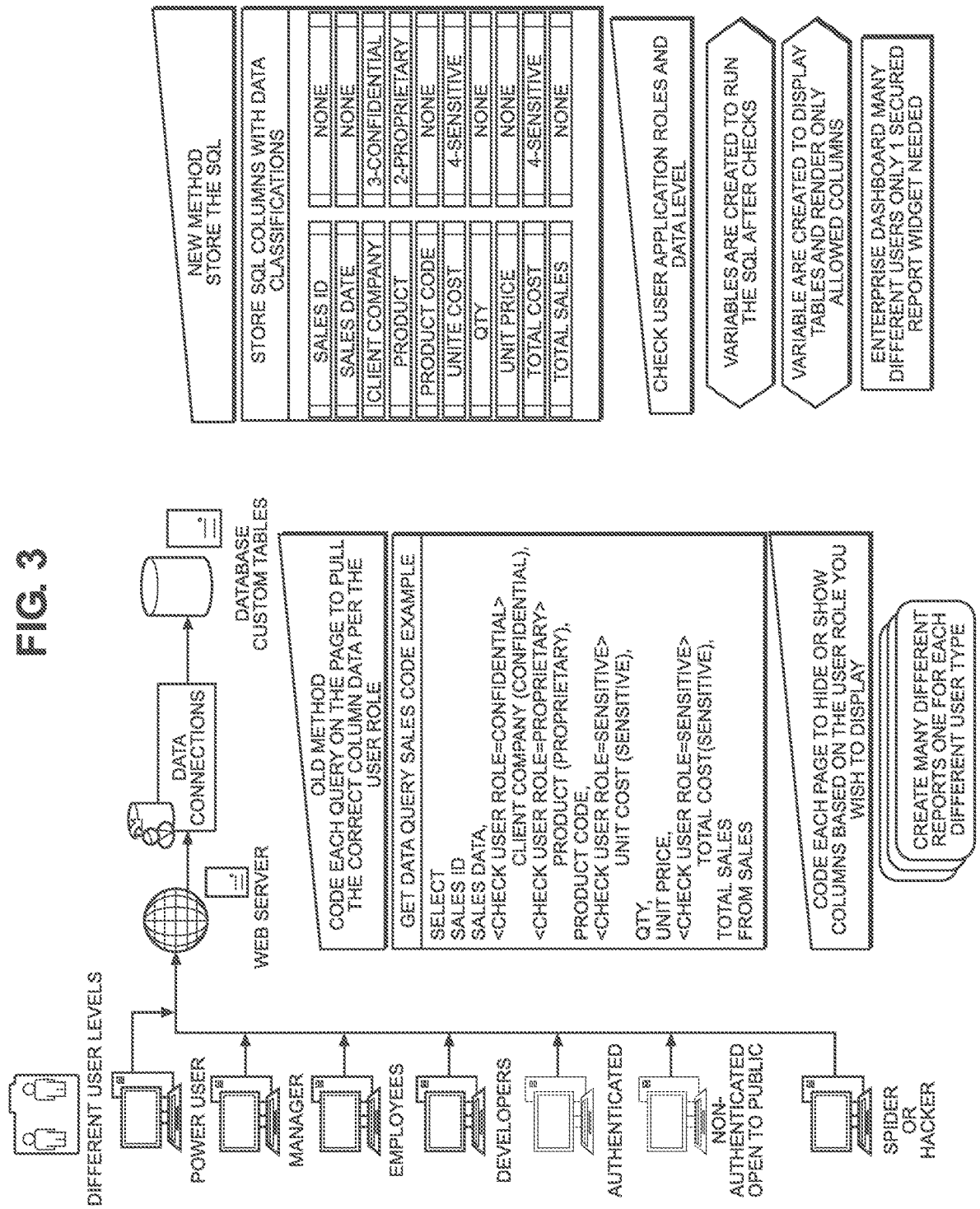

FIG. 4

A WEB PAGE

≡ EMPLOYER MONTHLY SALES

—SALES—

| ID | DATE | CLIENT (CONFIDENTIAL) | PRODUCT (PROPRIETARY) | PRODUCT CODE | UNIT COST (SENSITIVE) | QTY | UNIT PRICE | TOTAL COST (SENSITIVE) | TOTAL SALES (SENSITIVE) |
|---|---|---|---|---|---|---|---|---|---|
| S1001 | 2017-12-16 | ACME | WIDGETS | W1A | $50 | 15 | $100 | $750 | $1500 |
| S1001 | 2017-12-16 | ACME | WIDGETS | W1B | $25 | 10 | $50 | $250 | $500 |
| S1002 | 2017-12-16 | ABC PRODUCTS | WIDGETS | W1A | $50 | 10 | $100 | $500 | $1000 |
| | | | | | | | | SUM COST $1500 | SALES TOTAL $3000 |

—COMMISSIONS—

| ID | DATE | CLIENT COMPANY (CONFIDENTIAL) | PRODUCT (PROPRIETARY) | PRODUCT CODE | SALES | COMMISSION RATE | COMMISSION |
|---|---|---|---|---|---|---|---|
| S1001 | 2017-12-16 | ACME | WIDGETS | W1A | $1500 | 20% | $300 |
| S1001 | 2017-12-16 | ACME | WIDGETS | W1B | $500 | 10% | $50 |
| S1002 | 2017-12-16 | ABC PRODUCTS | WIDGETS | W1A | $1000 | 20% | $200 |

—PAYROLL—

| PAY ID | DATE | EMPLID (CONFIDENTIAL) | FULL NAME (PROPRIETARY) | BASE SALARY | COMMISSION | TOTAL PAY | TAXES | |
|---|---|---|---|---|---|---|---|---|
| P1001 | 2017-12-31 | 101 | SAMMY | $500 | $550 | $1050 | $750 | $245 $995 |

DATA CLASSIFICATION OF COLUMNS FOR WEB REPORTS AND WIDGETS

CROSS-REFERENCE TO RELATED APPLICATION

This application claims the benefit of priority of U.S. provisional application No. 62/902,001, filed 18 Sep. 2019, the contents of which are herein incorporated by reference.

BACKGROUND OF THE INVENTION

When creating a Data Source in most Reporting Applications a generic UserID and Password is used to configure the connection. The ColdFusion CFQuery tag supports passing in the current user's UserID and Password, but too often this service account is used for the data queries. This use of a Generic Account does not allow for restricting data access levels at the database level. The level of access for Generic Account is used for all the queries. If the Generic Account has the highest level of access the applications may use roles to limit the display of data on the Report page.

Reports may be written with code checking roles to control the columns pulled in a query and control display of sensitive data displayed on pages. Often the same SQL are used to create many different report pages to address each user audience and security group. Maintaining and modifying multiple SQL code bases for many different reports for different groups or application roles can be complex.

There may be many spots to review code for column rendering controls of the data query and display of the data on a page. Multiple queries and report widgets may be on the same Dashboard page. Those queries may be used to get data, filter or join multiple data sources or group and aggerate totals. Data access controls may only be a simple hide and show of the display of data on the page and not address the query that runs to get the data from the source. This creates the possibility of data leakages within the data cache or worse the display variables are not coded correctly and displayed to a user by mistake.

Worse is the Export functions that are coded on separate pages that do not match multiple modifications of display widgets.

The reporting tool embodied in the present invention checks both rendering and export data classification levels. So, you have to only modify one web form. Current reporting tools simply use a role-based method for coding the page of elements for each report. If not configured correctly, an unauthorized user can view and export the whole report.

SUMMARY OF THE INVENTION

In one aspect of the present invention, a method of restricting data through a data source connection with a web application includes the following: applying a data classification to each data column of the data source, wherein the application of each data clarification is based on a data set in a data file or data column in a database not supported by the data classification; and checking a data classification level associated with the data classification and a user's data access level prior to setting variables to create a query and render a table for said user.

In another aspect of the present invention, the method of restricting data through a data source connection with a web application may include mapping application roles to the data classification; mapping data source tables and columns to the data classification, wherein each data classification level includes data selection, display rendering and export, wherein each data column may be supported or unsupported for enabling classification of associated data feeds, wherein a data report of the data classification is based on the application role and the data set in such a way that the report and associated export controls to secure data sources by columns are not supported within the standard data source files.

These and other features, aspects and advantages of the present invention will become better understood with reference to the following drawings, description and claims.

BRIEF DESCRIPTION OF THE DRAWINGS

FIG. 3 is the rendering data from queries and the export function of an embodiment of the present invention side by side with the prior art; and FIG. 4 is an exemplary employee monthly sales report.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Referring to FIGS. 1 through 4, the present invention may include a method of restricting data through a data source connection with a web application, including applying a data classification to each data column of the data source, wherein the application of each data clarification is based on a data set in a data file or data column in a database not supported by the data classification.

Figure 1:
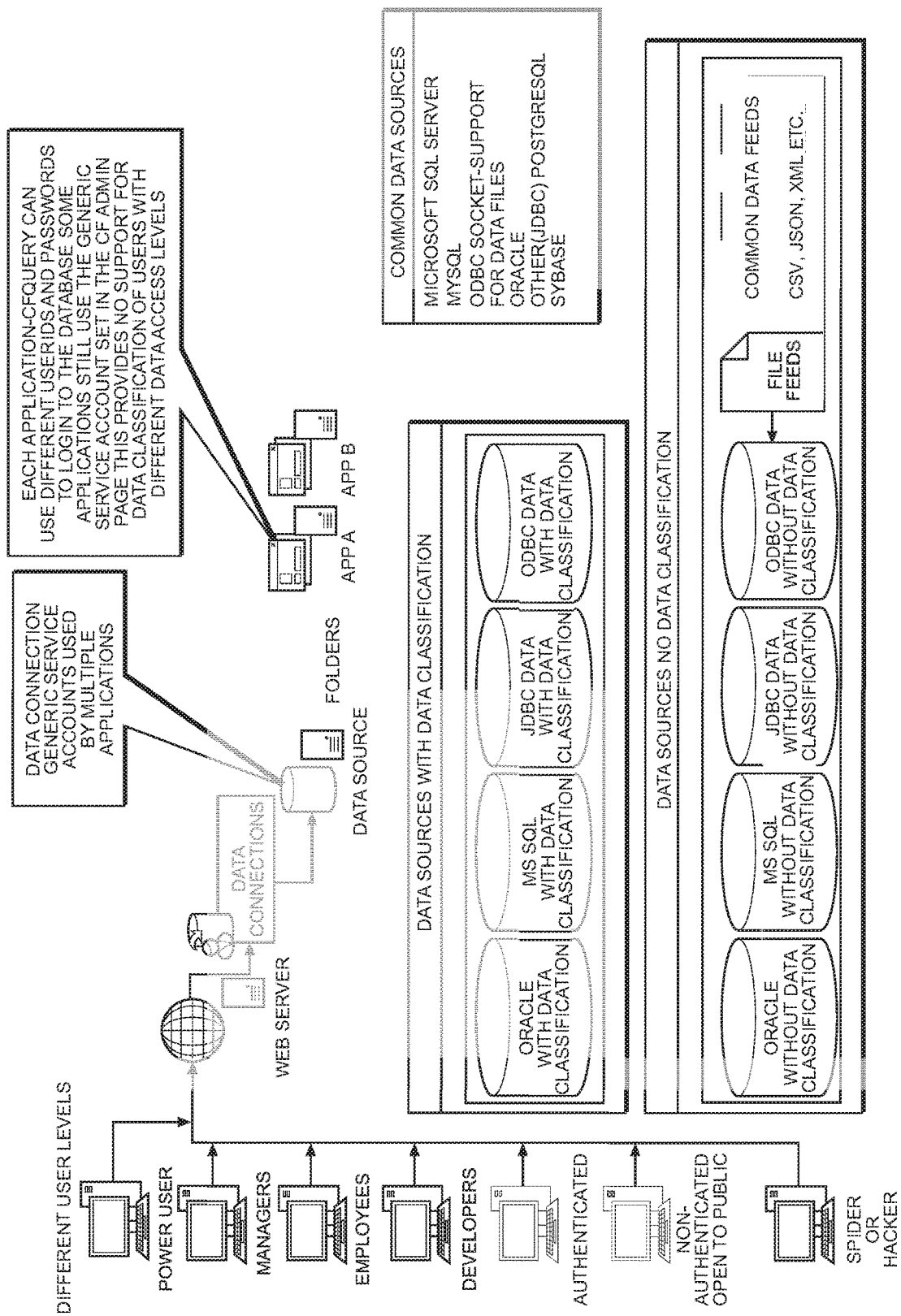
FIG. 1 is a diagram illustrating data collection of an embodiment of the present invention.

FIG. 1 illustrates data connections by listing some of the most Common and Legacy Data Sources that may be used with a web page report. This reporting Tool applies Data classification to data columns for supported and non-supported data sources. This allows for classification within the reporting tool for data feeds. Examples of data feeds with no data classification support could be files like CSV, JSON or XML data files that are being parsed to create a report.

Figure 2:
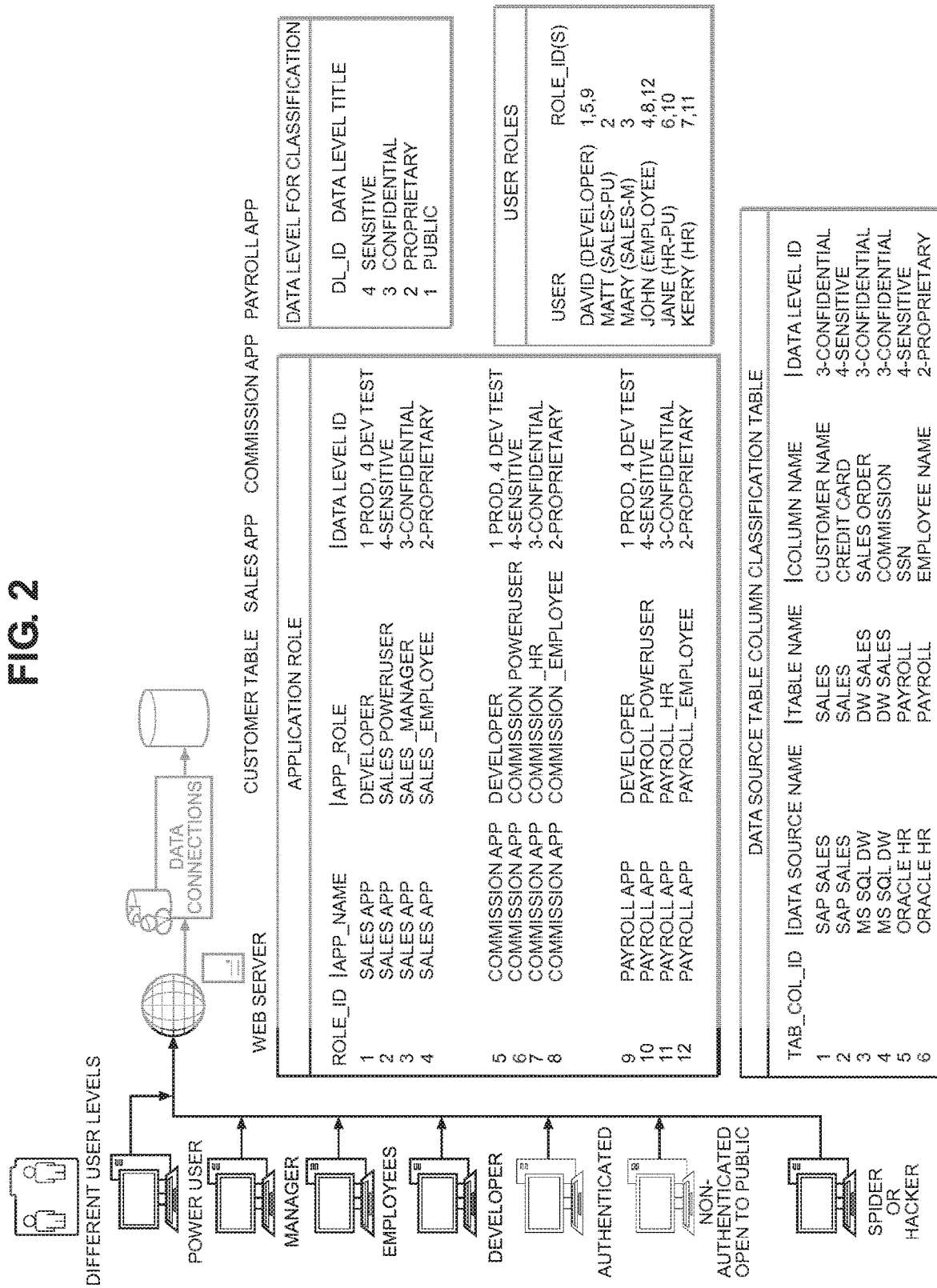
FIG. 2 is an exemplary data classification table.

FIG. 2 illustrates data classification tables. This figure lists some of the tables with sample data for the Employee Dashboard that includes the Summaries Reports from the Sales Application, Commission Application and the PayRoll Applications. Note the Developer Role has a higher level of access in Development and Testing with mock data sets and a lower level of access in Production Environment due to the sensitivity of the live data.

FIG. 3 illustrates data queries rendering data and the export function. This figure displays a sample of the old method of coding checks on each query to restrict columns by roles. The report data tables also need coding checks for different user roles for displaying or hiding sensitive data.

The new method checks the column data classification and the user's data access level before setting variables to create the query and render the tables. This method allows for roles to be easily added or removed from SQL models without the need to modify the code at many different spots.

This can help developers when adding different application roles and testing Dashboards with many different application report widgets.

By applying the data checks before building and running the SQL, the query can be used for many different access levels without the need to modify the code for a new role. To add new roles the developer can just update to the Role and Field mapping table.

FIG. 4 illustrates an employee Dashboard. Each section of the page is a report from different applications. The Dashboard displays summaries of Sales Data, Commissions and the Payroll summary.

Data Levels for Classifications can be added and labels can be changed per the client needs. Application Roles are mapped to the Data Classification Level Data Sources. Tables and Columns are mapped to a Data Classification Level. Mapped data classification levels are added to both application roles and to the data source tables and columns used within the application reports. The SQL is entered into a form and saved. The next process is to also check the user's data level for rendering of the tables. The same report can be used within multiple dashboards for different users with different data access levels.

Tables are created for data mapping of classifications: Data Classification Table; Application Role Classification Table; Data Source Table and Column Classification Table; Form Pages are used to Update the Tables.

A method of using the present invention may include the following. Database Admin: The database admin creates an application service user in the database and would run the database scripts to create the tables used for this application within the database. Server Admin: The database connection needs to be configured within the ColdFusion Administrator page. Data Modeler: Forms for Data Classification, Application Roles, Data Source Table Columns. The SQL needs to be entered into a form.

By mapping the data classification to the application roles and table columns, the same SQL can be used within different dashboards. There is now no need to update the SQL per user group role and create hide and show variables for different levels of user access. Each report has a simple hide and show check box on a simple form.

The present invention can produce reports for many different data sets not limited to just HR and Budget data. This can also include computer and network event logs. The data set and data source is not limited to a data set so the possibility for report output and applications are numerous. The report out would be based on the user's role data classification level to the data set's data classification level. This allows for the report and export controls to secure data sources by columns that are not supported within the standard data source files.

The present invention utilizes a web application and computing system. The ColdFusion web application commonly uses but is not limited to the following operating systems: WINDOWS and multiple versions of LINUX. ColdFusion also supports the following JEE Application Servers; WebLogic, WebSphere, Tomcat, Web Servers are IIS and Apache with Database Support for MS SQL Server, MySQL, PostgreSQL, IBM DB2, Oracle, Sybase and JDBC and ODBC data sources.

This methodology of data classification at all 3 points of data selection, display rendering and export with data classification level is the process for this reporting system. The restriction of data classification mapping to roles for securing data files is the method ColdFusion has used to demonstrate this methodology. The process of data restriction based on the data set elements in a data file or columns in a data base not supported by data classification is the embodiment of the present invention.

The web application, or webapp, of the present invention is an application that is accessed via a web browser over a network (e.g. Internet, mobile phone network, etc.). The web application can also be a computer software application that is coded in a browser-supported language (such as HTML, CSS, JavaScript, Java, PHP, etc.) and reliant on a common web browser to render the application executable. Web application code is typically stored on servers. At launch, the browser uses a web address such as a Uniform Resource Locator (URL) to fetch the web application code. The code is then downloaded to the computing system and the application is executed, either inside the browser or using the browser functionality. Over the course of execution, additional code can be downloaded and executed. The computing system may also store the web application code locally, in which case the web application URL points to a local file. The web application may also be preloaded on the computing system prior to delivery. This is common with, for example, preloaded applications on cell phones or laptop computers. The present invention may utilize any appropriate web application, including future web applications.

It should be understood, of course, that the foregoing relates to exemplary embodiments of the invention and that modifications may be made without departing from the spirit and scope of the invention as set forth in the following claims.

What is claimed is:

1. A method of restricting data of a plurality of applications from one or more data sources through a dashboard reporting web application, comprising:
    modeling to one or more intermediate tables to be used in a shared dashboard, wherein each intermediate table comprises each data classification of each the plurality of applications and an associated data classification level for each data classification, wherein the associated data classification levels are defined by a data modeler outside the plurality of applications as a function of resolving differing application roles applied by the plurality of applications to the respective data classifications;
    mapping the differing application roles to the associated data classification levels; and
    checking the associated data classification level of the one or more intermediate tables against one or more application roles of a user prior to setting variables to create a query and render a table in the shared dashboard for said user.

2. The method of claim 1, further comprising mapping data source tables and columns to the one or more intermediate tables.

3. The method of claim 1, wherein each associated data classification level includes data selection, display rendering and export.

4. The method of claim 1, wherein each associated data classification level is further defined by a determination of the data's sensitivity level and whether each data classification is a live data set or a mock data set.

5. The method of claim 4, wherein a data report of the data classification is based on the application role, the associated data classification level, and the data set type in such a way that the report and associated export controls to secure data by columns for the one or more data sources whether it is a database of a file feed.

* * * * *